_United States Patent Office_

3,639,575
Patented Feb. 1, 1972

3,639,575
SILVER ION GEL COMPOSITIONS AND METHOD OF USING THE SAME
Irving R. Schmolka, Grosse Ile, Mich., assignor to BASF Wyandotte Corporation, Wyandotte, Mich.
No Drawing. Continuation-in-part of application Ser. No. 580,204, Sept. 19, 1966. This application June 19, 1968, Ser. No. 738,110
Int. Cl. A61k 27/00
U.S. Cl. 424—78                                    7 Claims

ABSTRACT OF THE DISCLOSURE

Compositions, particularly effective in the treatment of burns, are prepared from water-soluble silver salts and, as a matrix therefor, aqueous gels of certain polyoxyethylene polyoxypropylene block copolymers.

---

This application is a continuation-in-part of copending U.S. patent application Ser. No. 580,204, filed Sept. 19, 1966.

The present invention relates to aqueous gel compositions containing silver ions. More particularly, the invention relates to compositions prepared from aqueous gels of certain polyoxyethylene polyoxypropylene block copolymers as a matrix for silver ions.

The treatment of burns with silver ion solutions is well known in the art as evidenced by Moyer et al., Arch. Surg., 90, June 1965. Briefly, the known treatment of burns comprises applying a solution of silver nitrate to a burn wound. Because this treatment involves liquid solutions, it is known as a "wet dressing method." The conventional "wet dressing method" suffers from many disadvantages. Some of these include (1) exacerbation of the hypermetabolic state by increasing caloric deficit and heat loss, (2) loss of plasma water, serum protein, and serum electrolytes, (3) maceration of burn wound surfaces, (4) increase of the fluid loss by vaporization, (5) extensive nursing care, and (6) economic loss due to discoloration of bedding, equipment, floors, and walls. With so many disadvantages, it is little wonder that the art has searched for an alternate method of treating burns.

It is an object of the present invention to provide aqueous gels containing silver ions, which gels may be effectively employed in the treatment of burns. It is a further object of the present invention to provide a manner of employing silver ions in the treatment of burns which overcomes the disadvantages associated with the conventional "wet dressing method." Another object of the present invention is to provide a transparent aqueous gel containing silver ions which enables a physician to observe the burn site by direct vision, thus assisting in the determination of when skin grafting should commence. Still another object of the present invention is to provide an aqueous gel containing silver ions, which gel can carry normal physiological amounts of electrolytes and fluids, thus preventing migration of these materials from the body into the gel. An additional object of the present invention is to provide an aqueous composition containing silver ions, which composition gels when warm and liquefied when cold. These and other objects of the present invention will be apparent from the specification and examples which follow.

Then above objects of the present invention are accomplished by the use of certain polyoxyethylene polyoxypropylene block copolymers as a matrix for silver ions in the preparation of aqueous fel compositions. The transparent gels so prepared are easily applied and removed from the wound surface since they are readily converted to liquids by cooling. Moreover, the gels eliminate (1) gradients causing evaporation and caloric deficients, and (2) maceration of tissue in burn site.

As used herein, the term "gel" is defined as a solid or semisolid colloid containing considerable quantities of water. The particles in a gel are linked in a coherent meshwork which immobilizes the water. A colloidal solution with water as the dispersion medium is often called a "hydrosol." The gels within the scope of the present invention are more specifically "ringing" gels and may be described as gels that have a firm jelly-like consistency; that is, by tapping the gel lightly it will vibrate and return to its original configuration.

The compositions of the present invention comprise (1) a medicative amount of a water-soluble silver salt and (2) as a matrix therefore, an aqueous gel comprising, based on 100 parts by weight, (a) from 18 to 50 parts, preferably from 18 to 25 parts, of a polyoxyethylene polyoxypropylene copolymer and (b) from 50 to 82 parts, preferably from about 75 to 82 parts, of water. By the phrase "medicative amount" as used herein is meant the amount of silver salt which is effective to treat the burn wound. Generally, this amount is from about 0.1% to 1.0% by weight of silver salt based on the weight of the water in the gel.

The water soluble silver salts which may be employed in the preparation of the gels of the present invention are those silver salts which will dissolve in water at a minimum concentration of 0.1% by weight. Representative silver salts include silver nitrate, silver acetate, silver sulfate, and silver lactate.

The polyoxyethylene polyoxypropylene block copolymers which may be employed in the preparation of the gels of the present invention may be represented by the formula (I)     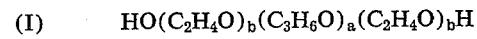

wherein $a$ is an integer such that the hydrophobe represented by $(C_3H_6O)$ has a molecular weight of at least 2250, preferably from 2750 to 4000, and $b$ is an integer such that the hydrophile portion represented by $(C_2H_4O)$ constitutes from about 10 to 90, preferably from 50 to 90, weight percent of the copolymer.

The hydrophobe of the polyoxyethylene polyoxypropylene block copolymers of Formula I above is prepared by adding propylene oxide to the two hydroxyl groups of a propylene glycol nucleus. By adding ethylene oxide to the hydrophobe, it is possible to place polyoxyethylene hydrophilic groups on both ends of the molecule. These hydrophilic polyoxyethylene groups may be controlled to constitute anywhere from 10% to 90% of the final molecule. A more detailed explanation of the preparation of these block copolymers may be found in U.S. Pat. No. 2,674,619.

Illustrative block copolymers of Formula I above which may be employed in the preparation of the gels of the present invention are presented in Table I.

TABLE I

| Copolymer | Mol. wt. of hydrophobe base (average) | Wt. percent of hydrophile (average) | Approx. total mol. wt. of copolymer |
|---|---|---|---|
| A | 2,250 | 50 | 4,600 |
| B | 2,250 | 70 | 7,500 |
| C | 2,250 | 80 | 10,750 |
| D | 2,750 | 45 | 4,910 |
| E | 2,750 | 60 | 6,450 |
| F | 2,750 | 80 | 13,500 |
| G | 3,250 | 35 | 4,910 |
| H | 3,250 | 45 | 6,050 |
| J | 3,250 | 50 | 6,550 |
| K | 3,250 | 80 | 15,500 |
| L | 4,000 | 15 | 4,710 |
| M | 4,000 | 25 | 5,340 |
| N | 4,000 | 35 | 6,150 |
| P | 4,000 | 70 | 13,500 |
| Q | 4,000 | 80 | 20,000 |

Not all of the block copolymers of the formula (I)     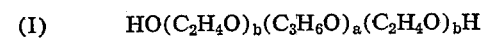

may be employed in the present invention. Because of the nature of aqueous solutions of these block copolymers, three variables affect the formation of the gels. Therefore, it is necessary to recognize certain minima for the three variables. These variables are:

(1) the weight percent concentration of block copolymers in the gel,
(2) the molecular weight of the hydrophobe $(C_3H_6O)_a$, and
(3) the weight percent of the hydrophile portion $(C_2H_4O)_b$ of the copolymer.

These minima define a minimum weight percent concentration of the block copolymer with a specific hydrophobe having a minimum weight percent of ethylene oxide that is necessary to form a gel. Thus, at the minimum concentration with a specific molecular weight hydrophobe, a minimum weight percent of ethylene oxide is required before a specific block copolymer will form a gel in an aqueous solution. The minimum weight percent concentrations with specific molecular weight hydrophobes are set out in Table II.

TABLE II

| Mol. wt. of hydrophobe base | Min. weight percent concentration to form a gel | Min. weight percent of ethylene oxide required | Total mol. wt. of block copolymer |
|---|---|---|---|
| 2,250 | 40 | 50 | 4,600 |
| 2,750 | 40 | 45 | 4,910 |
| 2,750 | 30 | 60 | 6,450 |
| 3,250 | 30 | 35 | 4,910 |
| 4,000 | 50 | 15 | 4,710 |
| 4,000 | 30 | 35 | 6,150 |
| 4,000 | 20 | 70 | 13,500 |

In interpreting Table II, it is apparent that at least a 40% weight concentration of the block copolymer having a hydrophobe of at least 2,250 molecular weight with at least about 50 weight percent of ethylene oxide condensed therewith will be necessary to form a gel in an aqueous solution. In all cases, the block copolymers above the minima indicated in Table I will form gels in aqueous solutions up to 90 weight percent concentration and higher. Above 90 weight percent concentration, however, the gels tend to become indistinguishable from the starting block copolymer itself. It is to be understood that the molecular weight of the hydrophobe may be other than those illustrated in Table I. Thus, for example, if a hydrophobe of about 2,500 molecular weight is used, it is recognized that a gel may be formed from the block copolymer at a concentration of 40 weight percent in an aqueous solution where about 45 weight percent of ethylene oxide is present in the block copolymer.

The technical explanation for the formation of the gels of the invention is not entirely understood, and the explanation hereinafter is not to be considered as being limitative of the invention. However, the behavior of these block copolymers in forming the gels is believed to be explained on the basis of hydrate formation. It may be speculated that the hydrophobe, because it is different from the hydrophobe of other types of nonionics, may, in its own right, immobilize the water independently of the oxyethylene chain by hydrogen bonding. It is noteworthy that gel formation occurs at about 70° to 80° F., even where the block copolymer contains more than 200 moles of ethylene oxide or over 100 moles per block. It is also believed that the nature of the block copolymer adds to this phenomenon. It should be noted that the block copolymer used in the gels of this invention exhibits a hydrophobe lying between two equal hydrophiles, whereas nonionics commonly encountered, such as the oxyethylated fatty alcohols and alkyl phenols, have only one hydrophile chain. This difference in structure suggests that a loose micellar structure is obtained with this class of nonionics and that gel formation would more readily involve entrapment of free water in addition to water due to hydrogen bonding.

The compositions of the invention may be prepared in either of two ways. The block copolymer may be dissolved in water cooled to a temperature between 35° F. and 50° F., and the silver salt slowly added to the cool copolymer solution. The solution is then allowed to warm to room temperature whereby a clear ringing gel is formed. Alternatively, the silver salt may be added to cold water and then the block copolymer may be added with good mixing. Mixing is continued, maintaining the solution temperature below 50° F. until the copolymer is completely in solution. At this point, the solution is allowed to warm to room temperature, whereby a clear ringing gel is formed.

In addition to the silver salts mentioned above, the compositions of the present invention may contain other nontoxic medicaments commonly employed in the treatment of skin. Illustrative of these medicaments are antibiotics such as bacitracin, neomycin sulfate; hormones such as cortisone and hydrocortisone; vitamins, lanolin, glycerine, and various other oils.

The following examples illustrate the nature of the invention. All parts are by weight unless otherwise stated.

EXAMPLE I

A gel composition useful in the treatment of burns was prepared from the following ingredients:

| | Parts |
|---|---|
| Copolymer P | 21.0 |
| Silver nitrate | 0.4 |
| Water | 78.6 |

Copolymer P is a 13,500 molecular weight block copolymer of Formula I having a hydrophobe average molecular weight of 400 and a hydrophile constituting 70% by weight of ethylene oxide based on the total weight of the copolymer.

The gel was prepared by adding Copolymer P to water at 35° F. and mixing until all of the copolymer had dissolved in the water. Silver nitrate was then added to the cooled solution. The solution was then allowed to warm to room temperature whereby a ringing gel formed.

The resulting transparent gel composition possessed anti-burn properties, rendering it effective in the treatment of burn wounds. Since the composition is readily converted to a liquid by cooling, it can be applied to the wound surface as a liquid which forms a gel by heat from the body and surroundings. In addition, this same property allows the gel to be readily removed by washing with cold water. Moreover, no maceration of tissue in the burn site or vaporization of fluids is observed.

EXAMPLE II

Gel compositions were prepared from the following ingredients in the manner described in Example I:

(A)

21.0 parts of Copolymer P
0.5 part of silver sulfate
78.5 parts of water (B)

21.0 parts of Copolymer P
0.5 part of silver acetate
78.5 part of water (C)

21.0 parts of Copolymer P
0.5 part of silver lactate monohydrate
78.5 parts of water All three compositions possess the advantageous property of liquefying when cool. Thus, as discussed in Example I, they are easily applied and removed from the burn site. Moreover, all compositions were transparent gels, thus providing a means of observing the burn site without removal of a dressing.

EXAMPLE III

A gel composition useful in the treatment of burn wounds and containing an antibiotic to assist in the prevention of micro-organism growth on the burn site was prepared from the following ingredients in the manner described in Example I:

|  | Parts |
|---|---|
| Copolymer P | 21.0 |
| Silver nitrate | 0.5 |
| Neomycin sulfate | 0.5 |
| Water | 78.0 |

EXAMPLE IV

A gel composition useful in the treatment of burn wounds and containing a vitamin to enrich the skin was prepared from the following ingredients:

|  | Parts |
|---|---|
| Copolymer P | 21.0 |
| Vitamin A | 0.5 |
| Silver nitrate | 0.5 |
| Water | 78.0 |

The gel was prepared by adding Vitamin A to Copolymer P and heating to dissolve Vitamin A in the copolymer. The water was then added and the resulting mixture was then cooled to 35° F. At this point, the silver nitrate was added to the cooled solution. The solution was then allowed to warm to room temperature whereby a transparent ringing gel formed.

EXAMPLE V

A gel composition useful in the treatment of burns is prepared in the manner described in Example I from the following ingredients:

|  | Parts |
|---|---|
| Copolymer K | 30.0 |
| Silver nitrate | 0.35 |
| Water | 69.65 |

Copolymer K is a 15,500 average molecular weight block copolymer of Formula I having a hydrophobe average molecular weight of 3250 and a hydrophile constituting about 80% by weight of the copolymer.

The resulting transparent gel exhibits properties substantially similar to those described in Example I.

EXAMPLE VI

A gel composition useful in the treatment of burns is prepared in the manner described in Example I from the following ingredients:

|  | Parts |
|---|---|
| Copolymer J | 40.0 |
| Silver nitrate | 0.3 |
| Water | 59.7 |

Copolymer J is a 6550 average molecular weight block copolymer of Formula I having a hydrophobe average molecular weight of 3250 and a hydrophile constituting about 50% by weight of the copolymer.

The resulting transparent gel exhibits properties substantially similar to those described in Example I.

What is claimed is:

1. A composition comprising an effective amount to treat a burn wound of a water soluble silver salt selected from the group consisting of silver nitrate, silver sulfate, silver acetate and silver lactate monohydrate which will dissolve in water at a minimum concentration of 0.1% by weight and, as a matrix therefor, an aqueous gel consisting essentially of, based on 100 parts by weight,
    (a) from 18 to 50 parts of a polyoxyethylene polyoxypropylene block copolymer of the formula $$HO(C_2H_4O)_b(C_3H_6O)_a(C_2H_4O)_bH$$

wherein $a$ is an integer such that the hydrophobe represented by $(C_3H_6O)$ has a molecular weight of at least 2,250 to 4,000, and $b$ is an integer such that the hydrophile portion represented by $(C_2H_4O)$ constitutes from about 10 to 90 weight percent of the polymer, and
    (b) from 50 to 82 parts of water.

2. The composition of claim 1 wherein the silver salt is silver nitrate.

3. The composition of claim 1 comprising from about 0.1% to 1.0% by weight of silver salt based on the weight of the water in the gel.

4. The composition of claim 1 wherein the polyoxyethylene polyoxypropylene block copolymer has an average molecular weight hydrophobe of from 2,750 to 4,000 and the hydrophile portion of the copolymer constitutes from 50 to 90 weight percent of the copolymer.

5. The composition of claim 1 wherein the copolymer has an average molecular weight hydrophobe of from 2,750 to 4,000.

6. The composition of claim 1 wherein the hydrophile portion of the copolymer constitutes from 50 to 90 weight percent of the copolymer.

7. A process for the preparation of the composition of claim 1 which comprises the steps of
    (a) dissolving a copolymer of the formula $$HO(C_2H_4O)_b(C_3H_6O)_a(C_2H_4O)_bH$$

wherein $a$ is an integer such that the hydrophobe represented by $(C_3H_6O)$ has a molecular weight of at least 2,250, and $b$ is an integer such that the hydrophile portion represented by $(C_2H_4O)$ constitutes from about 10 to 90 weight percent of the copolymer, in water at a temperature between 35° F. and 50° F.,
    (b) adding a water soluble silver salt selected from the group consisting of silver nitrate, silver sulfate, silver acetate and silver lactate monohydrate which will dissolve in water at a minimum concentration of 0.1% by weight to the cool copolymer solution of step (a), and
    (c) allowing the solution resulting from step (b) to warm to room temperature whereby a clear gel is formed.

References Cited

UNITED STATES PATENTS

| 2,149,005 | 2/1939 | Bockmühl et al. | 424—132 |
| 3,036,118 | 5/1962 | Jackson et al. | 260—615 X |
| 3,092,552 | 6/1963 | Romans | 424—132 X |

ALBERT T. MEYERS, Primary Examiner

D. R. ORE, Assistant Examiner

U.S. Cl. X.R.

252—313; 424—Dig. 13, 132, 181, 238, 243, 290, 343, 344